(12) United States Patent
Xu

(10) Patent No.: US 7,440,613 B2
(45) Date of Patent: Oct. 21, 2008

(54) BINARY MASK INTERPOLATION

(75) Inventor: Xun Xu, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1111 days.

(21) Appl. No.: 10/661,315

(22) Filed: Sep. 12, 2003

(65) Prior Publication Data

US 2005/0058344 A1    Mar. 17, 2005

(51) Int. Cl.
*G06K 9/34* (2006.01)

(52) U.S. Cl. .................. 382/173; 382/236; 382/232; 382/233; 375/240.16

(58) Field of Classification Search .............. 382/164, 382/173, 232, 233, 236, 237, 103; 375/240.16; 348/143, 36
See application file for complete search history.

(56) References Cited

U.S. PATENT DOCUMENTS

| | | | |
|---|---|---|---|
| 4,550,435 A | 10/1985 | Hayman | |
| 5,068,726 A * | 11/1991 | Kondo et al. | 375/240.14 |
| 5,339,092 A | 8/1994 | Johnson et al. | |
| 5,907,626 A | 5/1999 | Toklu et al. | |
| 5,926,190 A | 7/1999 | Turkowski et al. | |
| 5,943,445 A * | 8/1999 | Dufaux | 382/236 |
| 6,181,805 B1 | 1/2001 | Koike et al. | |
| 6,192,079 B1 * | 2/2001 | Sharma et al. | 375/240.16 |
| 6,415,062 B1 | 7/2002 | Moed et al. | |
| 6,549,578 B1 * | 4/2003 | Maruya et al. | 375/240.23 |
| 6,687,301 B2 | 2/2004 | Moschetti | |
| 6,728,317 B1 * | 4/2004 | Demos | 375/240.21 |
| 6,771,834 B1 | 8/2004 | Martins et al. | |
| 6,819,796 B2 | 11/2004 | Hong et al. | |
| 7,006,686 B2 | 2/2006 | Hunter et al. | |
| 7,095,786 B1 * | 8/2006 | Schonfeld et al. | 375/240.16 |
| 2002/0071034 A1 | 6/2002 | Ito et al. | |
| 2005/0013496 A1 * | 1/2005 | Bruls et al. | 382/239 |

OTHER PUBLICATIONS

Sonka, et al., "Image Processing Analysis and Machine Vision", Chapman & Hall Computing Series, First Edition, 1993, pp. 422-443.
Sonka et al., "Image Processing, Analysis and Machine Vision", Chapman & Hall Computing, London, 1993, pp. 422-443.
Sonka et al., "Image Processing, Analysis and Machine Vision", Chapman & Hall Computing, London, 1993, pp. 507-541.

* cited by examiner

*Primary Examiner*—Matthew C. Bella
*Assistant Examiner*—Ali Bayat
(74) *Attorney, Agent, or Firm*—Blakely, Sokoloff, Taylor & Zafman LLP

(57) ABSTRACT

Generating a transitional mask is described. A video segmentation generates a first binary mask and a second binary mask. Binary mask interpolation interpolates the first binary mask and the second binary mask to generate one or more transitional binary masks.

40 Claims, 7 Drawing Sheets

BINARY MASK INTERPOLATION

TECHNICAL FIELD

This invention relates generally to video processing, and more particularly to binary mask interpolation for segmented video.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2003, Sony Electronics, Inc., All Rights Reserved.

BACKGROUND

Video segmentation is the process for breaking a video frame into a background scene and foreground objects. Due to the limitation of computational power, sometimes it is not possible to segment every video frame. Hence, some video frames are not segmented (e.g., some frames are skipped). The conventional process of generating segmentation masks for each the skipped frame includes copying a mask of the un-skipped frames, or through image morphing, which requires the user to manually provide a set of point correspondences between the segmentations of the un-skipped frames. These conventional processes are not practical for many applications, because simple mask copying results in a bumpy appearance, and image morph cannot be performed automatically without manual inputs from the user.

SUMMARY OF THE INVENTION

Generating a transitional mask is described. Video segmentation generates a first binary mask and a second binary mask. Binary mask interpolation interpolates the first binary mask and the second binary mask to generate one or more transitional binary masks.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Generation of a transitional mask is described. According to one embodiment, a video segmentation component includes a mask interpolation component which generates the transitional mask based on a binary mask interpolation process as will be described. In one embodiment, given two binary masks, the binary interpolation process generates one or more in-between transitional masks with the look of a smooth transitional position and shape variation. It should be appreciated that the generation of the transitional masks is achieved through simple computation, and in an automatic fashion (e.g., no need of manual user interaction), as will be described.

Figure 1A:
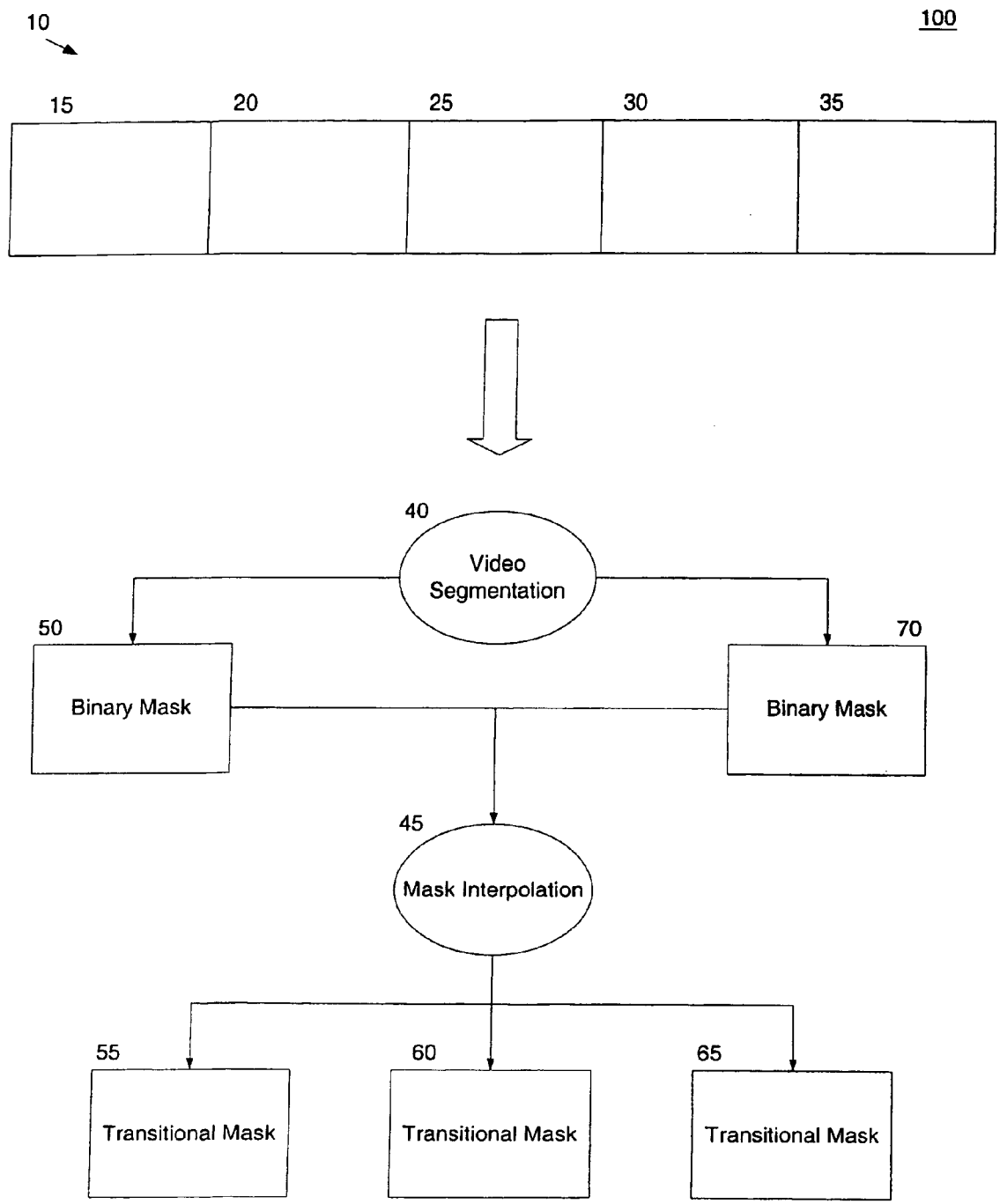
FIG. 1A illustrates one embodiment of a conceptual view of using binary mask interpolation in the application of video segmentation.
Figure 1B:
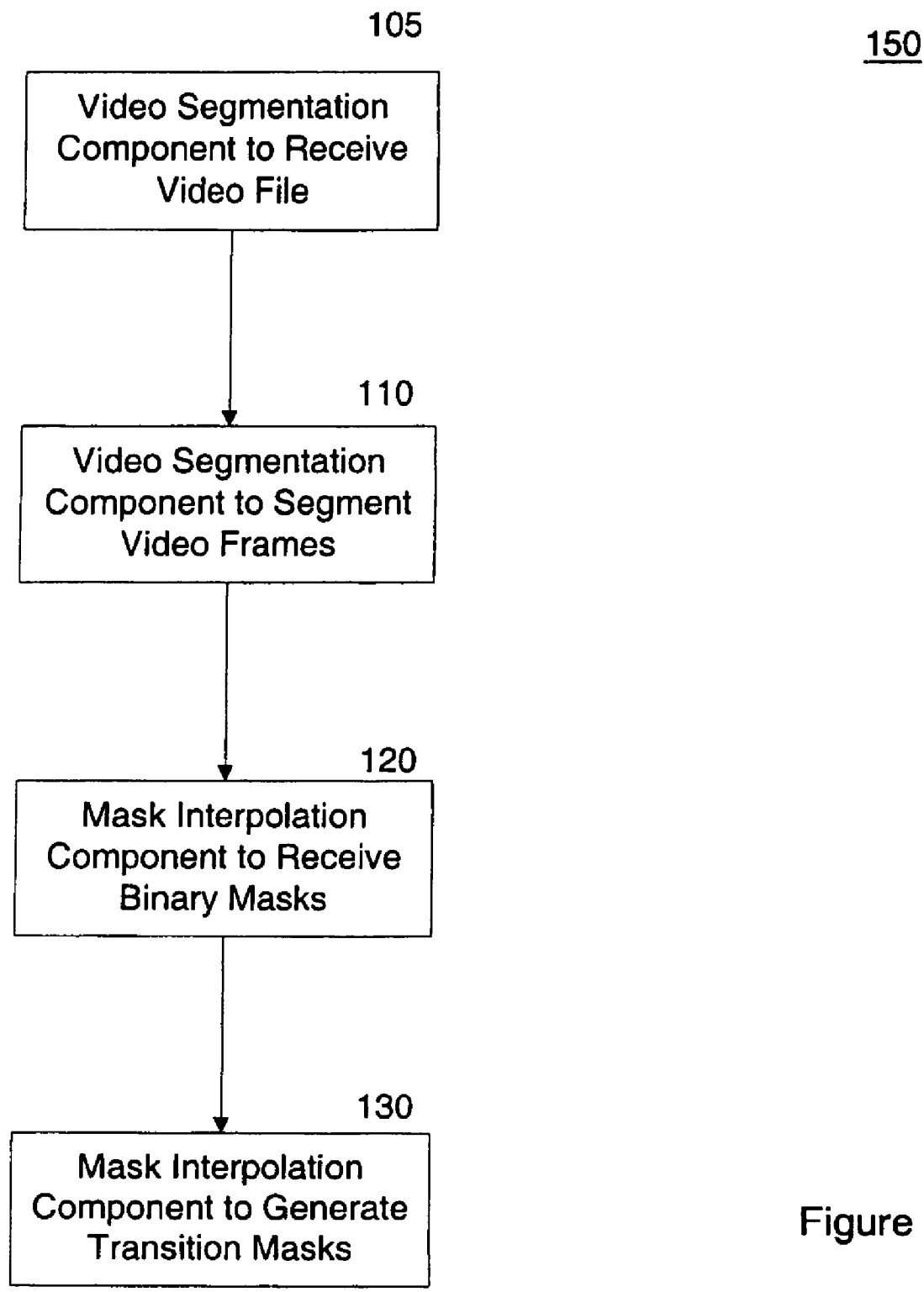
FIG. 1B illustrates one embodiment of a process flow for using binary mask interpolation in the application of video segmentation in relation to FIG. 1A.

FIG. 1A illustrates one embodiment of a conceptual view (100) of using binary mask interpolation in the application of video segmentation. FIG. 1B illustrates one embodiment of a process flow (150) for using binary mask interpolation in the application of video segmentation in relation to FIG. 1A.

At block 105 of FIG. 1B, the video segmentation component 40 receives a video file 10. The video file 10 includes consecutive video frame 15, video frame 20, video frame 25, video frame 30, and video frame 35, as shown in FIG. 1A. It is understood that the video file 10 is not limited to only 5 frames and the number of frames in the video file 10 is for illustrative purposes.

At block 110, the video segmentation component 40 segments video frame 15, and frame 35 to produce a binary mask 50 and a binary mask 70. A binary mask includes a binary image (e.g., a black and white representation of a foreground object or background object) in the video file 10. The binary image is typically the same size as the original image. In one embodiment, the video segmentation component 40 assigns pixels in the binary mask associated with the desired object of interest in the video frame as 1's (e.g., displayed as black) and all other pixels in the binary mask as 0's (e.g., displayed as white). In one embodiment the segmentation process automatically identifies the desired object.

In one embodiment, the segmentations of video frame 20, video frame 25, and video frame 30 are skipped. Their binary masks (transitional mask) are created by mask interpolation component 45 instead. The video segmentation component 40 segments every fourth video frame of the video file 10 to a binary mask (50, 70). It should be understood that the video segmentation component 40 is not limited to segmenting every fourth video frame of video file 10. The number of skipped frames (e.g., video frame 20, video frame 25, video frame 30) may vary, for example, based on the computational power of the computing device performing the video segmentation component 40.

At block 120, the mask interpolation component 45 receives the binary masks associated with the segmented video frame 15 and video frame 35.

At block 130, the mask interpolation component 45 generates one or more transitional masks using a binary mask interpolation process. For example, the mask interpolation component 45 may generate transitional mask 55, transitional mask 60, and transitional mask 65 corresponding to video frame 20, video frame 25, and video frame 30, respectively, of the video file 10. It should be appreciated that the process of generating multiple transitional masks (e.g., 55, 60, 65) may be performed simultaneously or in parallel.

Figure 2A:
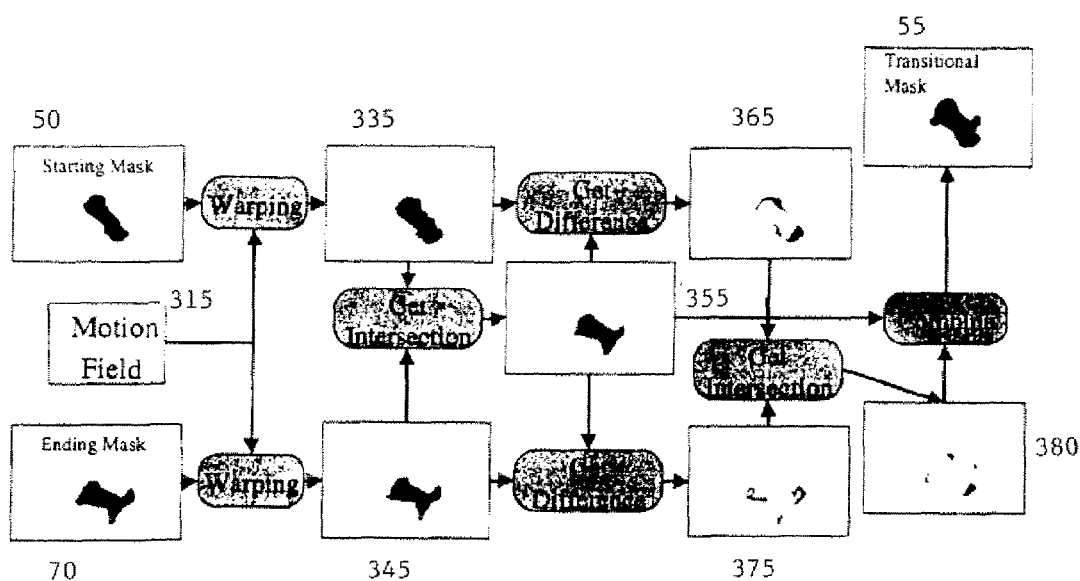
FIG. 2A illustrates one embodiment of a conceptual view of the binary mask interpolation process.
Figure 2B:
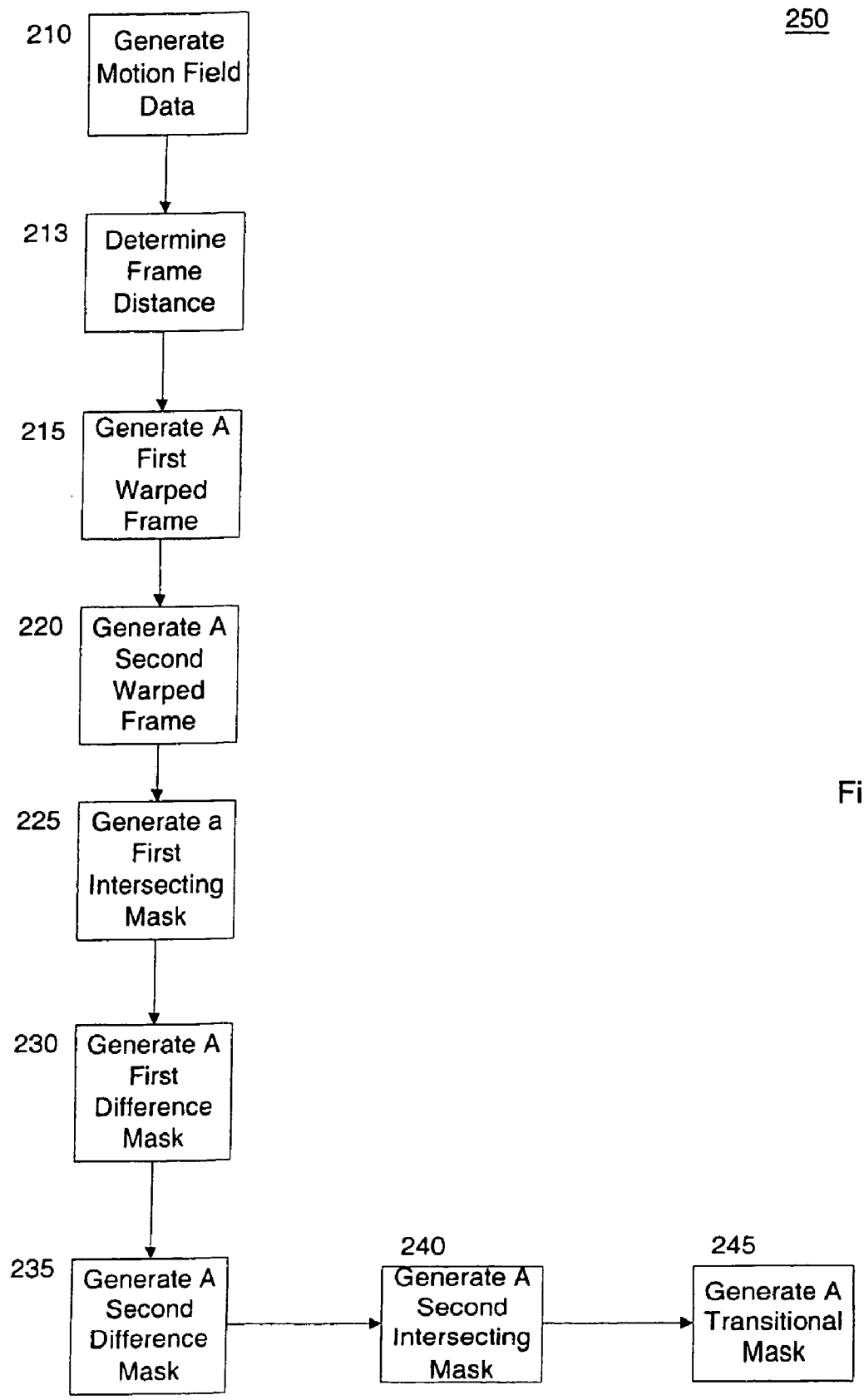
FIG. 2B illustrates one embodiment of a process flow for performing the binary mask interpolation in relation to FIG. 2A.

FIG. 2A illustrates one embodiment of a conceptual view (200) of the binary mask interpolation process performed at block 130 of FIG. 1B. FIG. 2B illustrates one embodiment of a process flow (250) for performing the binary mask interpolation process in relation to FIG. 2A.

At block 210 of FIG. 2A, the mask interpolation component 45 of FIG. 1A generates motion field data (315) based on the motion estimation of a starting mask (e.g., binary mask 50) and an ending mask (e.g., binary mask 70). It is understood the motion field is computed once and can be reused in producing multiple transitional masks (for example, 55, 60, 65). The motion field data 315 may have the same resolution as the input frame. Each point in the motion field (x, y) is associated with a motion vector (dx, dy). This motion vector defines the displacement between the input masks (e.g., binary mask 50 and binary mask 70) at a specific point. Usually the motion estimation is performed using the principle of optical flow, well known to those of ordinary skill in the art. In order to overcome the small motion restriction of the optical flow principle, the motion estimation may be performed in a coarse resolution or by aggressively 2D filtering the input mask pair.

At block 213, the mask interpolation component 45 determines a corresponding frame distance $D_s$ and $D_e$ for each of the transitional masks to be generated. $D_s$ and $D_e$ give the relative position of a skipped frame (transitional mask and/or binary mask) with respect to the adjacent un-skipped frames in a video file. In one embodiment, $D_s$ and $D_e$ are numbers between 0 and 1, and $D_s+D_e=1$. Therefore, given binary mask 50 and binary mask 70 as inputs, the $D_s$ and $D_e$ values for the transitional masks (55, 60, 65) are:

transitional mask 55, $D_s$=0.25, and $D_e$=0.75;
transitional mask 60, $D_s$=0.5, and $D_e$=0.5; and
transitional mask 65, $D_s$=0.75 and $D_e$=0.25.

Also, note that values for binary masks 50 and 70 are:
binary mask 50, $D_s$=0, $D_e$=1; and
binary mask 70, $D_s$=1, and $D_e$=0.

It should be appreciated that as $D_s$ is smaller, the transitional mask will appear more similar to the starting mask. Conversely, if $D_e$ is smaller, the transitional mask should appear more similar to the ending mask.

At block 215, the mask interpolation component 45 generates a first warped frame (335) based on the starting mask (e.g., binary mask 50) and the motion field data 315. In one embodiment, for each pixel (x, y) of the warped frame 335, a pixel value (black or white) is fetched from pixel $(x-D_s dx, y-D_s dy)$ of the binary mask 50, to generate the first warped frame 335. (dx,dy) is the motion vector provided by the motion field at position (x, y). After warping, the first warped frame 335 is slightly expanded.

At block 220, the mask interpolation component 45 generates a second warped frame 345 based on the ending mask (e.g., binary mask 70) and the motion field data 315. In one embodiment, for each pixel (x, y) of the warped frame 345, the pixel value is fetched from pixel $(x+D_e dx, y+D_e dy)$ of binary mask 70, to generate the second warped frame 345. (dx,dy) is the motion vector provided by the motion field at position (x, y). It should be appreciated that warping is taken to compensate for the position change between the starting and ending masks. After warping, the second warped frame 345 is slightly expanded.

At block 225, the mask interpolation component 45 generates a first intersecting mask 355 based on the first warped version of the starting mask (e.g., first warped frame 335) and the second warped version of the ending mask (e.g., the second warped frame 345). In this way, interpolation for shape change and position change will be reflected in the generated transitional masks (55, 60, 65), as will be further described below.

At block 230, the mask interpolation component 45 generates a first difference mask 365 based on the first warped frame 335 and the first intersecting mask 355. In one embodiment, the first difference mask 365 identifies regions in the first warped frame 335 that are not shown in the first intersecting mask 355.

At block 235, the mask interpolation component 45 generates a second difference mask 375 based on the second warped frame 345 and the first intersecting mask 355. In one embodiment, the second difference mask 375 identifies regions in the second warped frame 345 that are not shown in the first intersecting mask 355.

At block 240, the mask interpolation component 45 generates a second intersecting mask 380 based on the first difference mask 365 and the second difference mask 375.

At block 245, the mask interpolation component 45 generates a transitional mask (55) based on the first intersecting mask 355 and the second intersecting mask 380.

The mask interpolation component 45 may repeat the process 250 (except block 210, whose result is reused) for each of the transitional masks (60, 65) to be generated. In one embodiment, block 210 is performed only during the first iteration and the results are reused during each subsequent iteration. It will be understood that the two frame inputs to the process 200 need not be segmented binary masks generated from the video segmentation component 40. Alternatively, the two input frames may be a combination of a binary mask resulting from segmentation and a transitional mask, or alternatively two previously generated transitional masks (55, 60, 65).

It should be appreciated that the process of generating the first and second warped frames may be performed simultaneously or in parallel. Furthermore, the process of generating the first and second difference masks may also be performed simultaneously or in parallel. In addition, mathematical morphological filters, well known to those of ordinary skill in the art, may also be used on the generated transitional masks (55, 60, 65) to smooth out the transitional masks (55, 60, 65) before outputting it.

Figure 3:
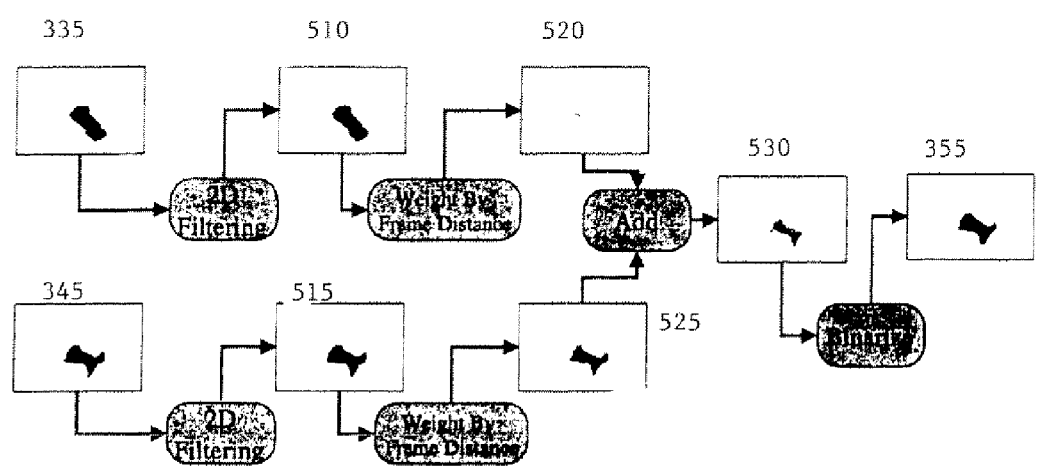
FIG. 3 illustrates one embodiment of a conceptual view of the process to generate an intersecting mask.
Figure 4:
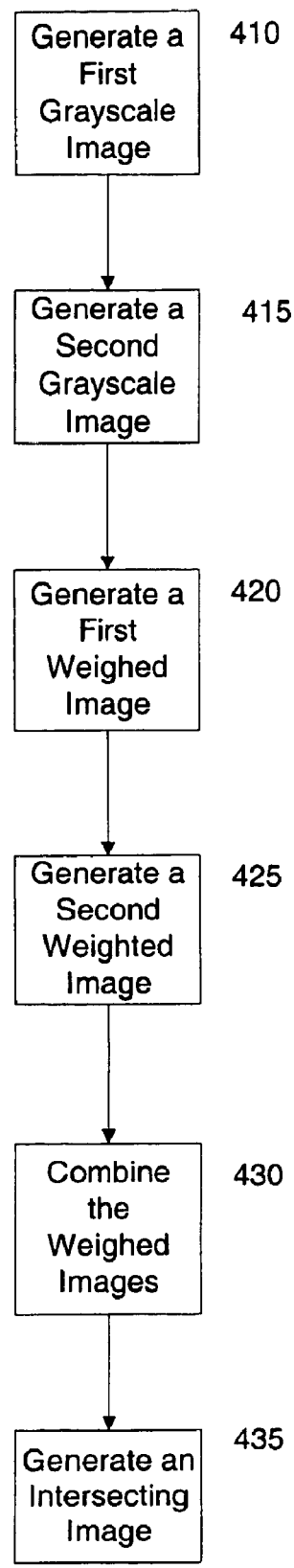
FIG. 4 illustrates one embodiment of a process flow for generating an intersecting mask in relation to FIG. 3.

FIG. 3 illustrates one embodiment of a conceptual view (300) of the process for generating an intersecting mask performed at block 225 and block 240 of FIG. 2B. FIG. 4 illustrates one embodiment of a process flow (400) for generating an intersecting mask in relation to FIG. 3.

At block 410, the mask interpolation component 45 generates a first grayscale image 510 using two-dimensional filtering on the first warped frame 335.

At block 415, the mask interpolation component 45 generates a second grayscale image 515 using two-dimensional filtering on the second warped frame 345.

At block 420, the mask interpolation component 45 generates a first weighted image 520 based on the first grayscale image 510. At block 425, the mask interpolation component 45 generates a second weighted image 525 based on the second grayscale image 515. It will be understood that if the generated transitional mask (55) is closer to the starting frame binary mask 50, the gray image associated to this frame should be assigned more weight. It will be similarly understood that the image associated to the ending frame (70) is weighted more if the generated transitional mask 55 is closer to the ending frame 70.

At block 430, the mask interpolation component 45 generates a combined image 530 by combining the first weighted image 520 and the second weighted image 525.

At block 435, the mask interpolation component 45 generates an intersecting image 355 by binarizing the combined image 530. In this way, the multilevel weighted grayscale image is represented by black and white pixels in the combined image. In one embodiment, the sum of the weighted images, image 530 is binarized through thresholding to give a binary mask. Thresholding is a technique to separate useful information out of raw data as is well known to those of ordinary skill in the art. For example, the mask interpolation component 45 may set all of the grayscale values above a specific threshold value to one, and set all of the grayscale values below a specific threshold value to zero.

It should be appreciated that the process of generating the first and second grayscale images may be performed simultaneously or in parallel. Furthermore, the process of generating the first and second weighted images may also be performed simultaneously or in parallel.

It will be understood that the processes described above need not generate a frame or an image on a display at each block stage as described. Rather, a computing device may store the values of each pixel without rendering the pixel value on a display. It is further understood that the conceptual views of each process are presented as an aid in describing an embodiment of the invention and are not necessarily incorporated into a computing device.

Figure 5:
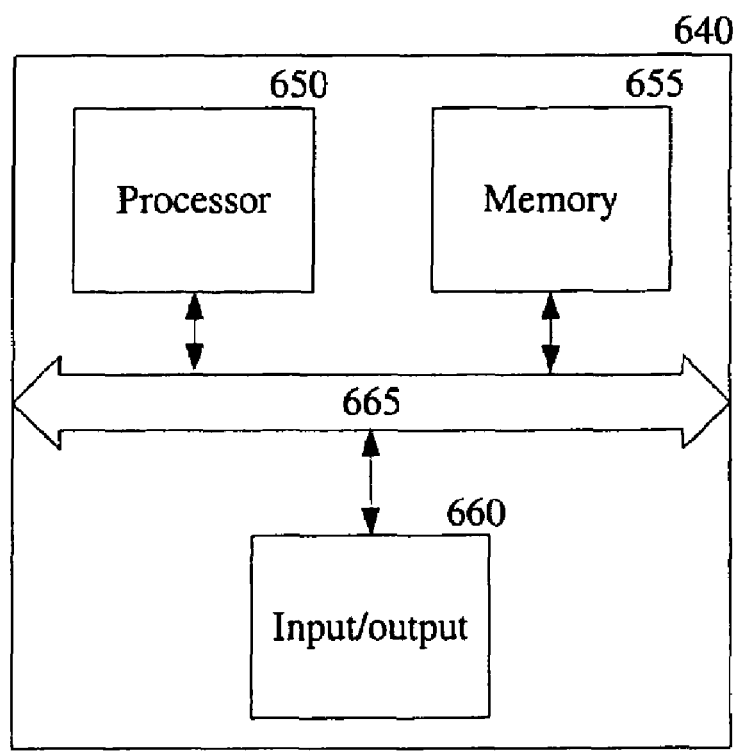
FIG. 5 illustrates one embodiment of a computer system suitable for performing the video segmentation and binary mask interpolation process.

FIG. 5 illustrates one embodiment of a computer system suitable for performing video segmentation and binary mask interpolation. The computer system 640 includes a processor 650, a memory 655, and an input/output capability 660, all coupled to a system bus 665. Such a configuration encompasses personal computer systems, network computers, television based systems (such as Web TVs or set-top boxes), handheld devices (such as mobile phones and personal digital assistants), and similar devices.

The processor 650 represents a central processing unit of any type of architecture, such as a CISC, RISC, VLIW, or hybrid architecture. In addition, the processor 650 could be implemented on one or more chips. The memory 655 is configured to store instructions which, when executed by the processor 650, perform the methods described herein. The memory 655 may also store the user information and the contact information.

Input/output 660 may include components to facilitate user interaction with the computer system 640 such as a keyboard, a mouse, a display monitor, a microphone, a speaker, a display, a network card (e.g., Ethernet, Inferred, cable modem, Fax/Modem, etc.), etc. For example, input/output 660 provides for the display of the video file 10, the binary masks (50, 70), and the transitional masks frames (55, 60, 65) or portions or representations thereof. Input/output 660 also encompasses various types of machine-readable media, including any type of storage device that is accessible by the processor 650. For example, a machine-readable medium may include read only memory ("ROM"); random access memory ("RAM"); magnetic disk storage media; optical storage media; flash memory devices; electrical, optical, acoustical, or other forms of propagated signals (e.g., carrier waves, infrared signals, digital signals, etc.); etc. Thus, a machine-readable medium includes any mechanism that provides (i.e., stores and/or transmits) information in a form readable by a machine (e.g., a computer). One of skill in the art will immediately recognize that the term "machine-readable medium/ media" further encompasses a carrier wave that encodes a data signal.

It will also be appreciated that the operating system software executing the video segmentation component and the mask interpolation component stored in memory 655 may control the computer system 640. The operating system may be, for example, PC-based, Mac-based, Unix-based, Palm OS, etc. Input/output and related media 660 store the machine-executable instructions for the operating system and methods of the present invention.

In addition, the bus 665 may represent one or more busses (e.g., PCI, ISA, X-Bus, EISA, VESA, etc.) and bridges (also termed as bus controllers). While this embodiment is described in relation to a single processor computer system, the invention could be implemented in a multi-processor computer system.

The description of FIG. 5 is intended to provide an overview of computer hardware and other operating components suitable for implementing the invention, but is not intended to limit the applicable environments. It will be appreciated that the computer system 640 is one example of many possible computer systems that have different architectures. A typical computer system will usually include at least a processor, a memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

It will be appreciated that more or fewer processes may be incorporated into the methods illustrated in FIGS. 1B, 2B, and 4 without departing from the scope of the invention and that no particular order is implied by the arrangement of blocks shown and described herein. It further will be appreciated that the method described in conjunction with FIGS. 1B, 2B, and 4 may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions, which may be used to program a computer (or other electronic devices) to perform the methods. For the purposes of this specification, the term "machine-readable medium" shall be taken to include any medium that is capable of storing or encoding a sequence of instructions for execution by the machine and that causes the machine to perform any one of the methodologies of the present invention. The term "machine-readable medium" shall accordingly be taken to include, but not be limited to, solid-state memories, optical and magnetic disks, and carrier wave signals. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or to produce a result.

Thus, generation of a transitional mask has been described. It should be appreciated that the application of the masking interpolation as described allows the position and shape changes of the transitional masks to appear smoother than prior art techniques when displayed. Also, the computation applied is simple and can be implemented faster because there is no need for user interaction. It should also be appreciated that the mask interpolation is not limited to the masks generated by video segmentation, but may be used for the interpolation of numerous types of binary masks well known to those of ordinary skill in the art.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention.

What is claimed is:

1. A computerized method of video segmentation comprising:
    generating a first binary mask and a second binary mask corresponding to video frames segmented from a video, each binary mask comprising a binary image representing one of a foreground or a background object in the corresponding video frame;
    generating a transitional segmentation mask for a video frame not segmented from the video by interpolating the first binary mask and the second binary mask.

2. The computerized method of claim 1, wherein the interpolating further comprises:
    generating motion field data based on the first binary mask and the second binary mask.

3. The computerized method of claim 2, wherein the interpolating further comprises:
    warping the first binary mask and the motion field data to generate a first warped frame; and
    warping the second binary mask and the motion data to generate a second warped frame.

4. The computerized method of claim 3, wherein the interpolating further comprises:
    intersecting the first warped frame and the second warped frame to generate an first intersecting frame.

5. The computerized method of claim 4, wherein the interpolating further comprises:
    differencing the first warped frame and the first intersecting frame to generate a first difference mask.

6. The computerized method of claim 5, wherein the differencing comprises identifying a first pixel in the first warped frame not in the first intersecting mask.

7. The computerized method of claim 5, wherein the interpolating further comprises:
    differencing the second warped frame and the first intersecting frame to generate a second difference mask.

8. The computerized method of claim 7, wherein the differencing comprises identifying a first pixel in the second warped frame not in the first intersecting mask.

9. The computerized method of claim 7, wherein the interpolating further comprises:
    intersecting the first difference mask and the second difference mask to generate a second intersecting mask.

10. The computerized method of claim 9, wherein the interpolating further comprises:
    combining the first intersecting mask and the second intersecting mask to generate the transitional mask.

11. A computer-readable medium storing executable instructions to cause a computer to perform a computerized method of video segmentation, the computerized method comprising:
    generating a first binary mask and a second binary mask corresponding to video frames segmented from a video, each binary mask comprising a binary image representing one of a foreground or a background object in the corresponding video frame;
    generating a transitional segmentation mask for a video frame not segmented from the video by interpolating the first binary mask and the second binary mask.

12. The computer-readable medium of claim 11, wherein the interpolating further comprises:
    generating motion field data based on the first binary mask and the second binary mask.

13. The computer-readable medium of claim 12, wherein the interpolating further comprises:
    warping the first binary mask and the motion field data to generate a first warped frame; and
    warping the second binary mask and the motion data to generate a second warped frame.

14. The computer-readable medium of claim 13, wherein the interpolating further comprises:
    intersecting the first warped frame and the second warped frame to generate an first intersecting frame.

15. The computer-readable medium of claim 14, wherein the interpolating further comprises:
    differencing the first warped frame and the first intersecting frame to generate a first difference mask.

16. The computer-readable medium of claim 15, wherein the differencing comprises identifying a first pixel in the first warped frame not in the first intersecting mask.

17. The computer-readable medium of claim 15, wherein the interpolating further comprises:
    differencing the second warped frame and the first intersecting frame to generate a second difference mask.

18. The computer-readable medium of claim 17, wherein the differencing comprises identifying a first pixel in the second warped frame not in the first intersecting mask.

19. The computer-readable medium of claim 17, wherein the interpolating further comprises:
    intersecting the first difference mask and the second difference mask to generate a second intersecting mask.

20. The computer-readable medium of claim 19, wherein the interpolating further comprises:
    combining the first intersecting mask and the second intersecting mask to generate the transitional mask.

21. A system comprising:
    a processor coupled to a memory through a bus; and
    an interpolation process executed by the processor from the memory to cause the processor to generate a first binary mask and a second binary mask corresponding to video frames segmented from a video, each binary mask comprising a binary image representing one of a foreground or a background object in the corresponding video frame and to generate a transitional segmentation mask for a video frame not segmented from the video by interpolating the first binary mask and the second binary mask.

22. The system of claim 21, wherein the interpolation process to further cause the processor to generate motion field data based on the first binary mask and the second binary mask.

23. The system of claim 22, wherein the interpolation process to further cause the processor to warp the first binary mask and the motion field data to generate a first warped frame, and to warp the second binary mask and the motion data to generate a second warped frame.

24. The system of claim 23, wherein the interpolation process to further cause the processor to intersect the first warped frame and the second warped frame to generate an first intersecting frame.

25. The system of claim 24, wherein the interpolation process to further cause the processor to difference the first warped frame and the first intersecting frame to generate a first difference mask.

26. The system of claim 25, wherein the differencing comprises identifying a first pixel in the first warped frame not in the first intersecting mask.

27. The system of claim 25, wherein the interpolation process to further cause the processor to difference the second warped frame and the first intersecting frame to generate a second difference mask.

28. The system of claim 27, wherein the differencing comprises identifying a first pixel in the second warped frame not in the first intersecting mask.

29. The system of claim 27, wherein the interpolation process to further cause the processor to intersect the first difference mask and the second difference mask to generate a second intersecting mask.

30. The system of claim 29, wherein the interpolation process to further cause the processor to combine the first intersecting mask and the second intersecting mask to generate the transitional mask.

31. An apparatus comprising:
a means for generating a first binary mask and a second binary mask corresponding to video frames segmented from a video, each binary mask comprising a binary image representing one of a foreground or a background object in the corresponding video frame; and
a means for interpolating the first binary mask and the second binary mask to generate a transitional segmentation mask for a video frame not segmented from the video.

32. The apparatus of claim 31, wherein the means for interpolating further comprises:
a means for generating motion field data based on the first binary mask and the second binary mask.

33. The apparatus of claim 32, wherein the means for interpolating further comprises:
a means for warping the first binary mask and the motion field data to generate a first warped frame; and
a means for warping the second binary mask and the motion data to generate a second warped frame.

34. The apparatus of claim 33, wherein the means for interpolating further comprises:
a means for intersecting the first warped frame and the second warped frame to generate an first intersecting frame.

35. The apparatus of claim 34, wherein the means for interpolating further comprises:
a means for differencing the first warped frame and the first intersecting frame to generate a first difference mask.

36. The apparatus of claim 35, wherein the means for differencing comprises identifying a first pixel in the first warped frame not in the first intersecting mask.

37. The apparatus of claim 35, wherein the means for interpolating further comprises:
a means for differencing the second warped frame and the first intersecting frame to generate a second difference mask.

38. The apparatus of claim 37, wherein the means for differencing comprises identifying a first pixel in the second warped frame not in the first intersecting mask.

39. The apparatus of claim 37, wherein the means for interpolating further comprises:
a means for intersecting the first difference mask and the second difference mask to generate a second intersecting mask.

40. The apparatus of claim 39, wherein the means for interpolating further comprises:
a means for combining the first intersecting mask and the second intersecting mask to generate the transitional mask.

* * * * *